(12) United States Patent
Janarthanam et al.

(10) Patent No.: US 8,920,984 B2
(45) Date of Patent: Dec. 30, 2014

(54) SYSTEM AND METHOD FOR PURGING WATER FROM A FUEL CELL STACK

(75) Inventors: Suriyaprakash Ayyangar Janarthanam, Westland, MI (US); Victor Dobrin, Ypsilanti, MI (US); Scott Aaron Black, Royal Oak, MI (US); Milos Milacic, New Boston, MI (US); Kurt David Osborne, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 2028 days.

(21) Appl. No.: 12/033,444

(22) Filed: Feb. 19, 2008

(65) Prior Publication Data

US 2009/0208789 A1 Aug. 20, 2009

(51) Int. Cl.
*H01M 8/18* (2006.01)
*H01M 8/06* (2006.01)
*H01M 8/04* (2006.01)
*B60L 11/18* (2006.01)
*H01M 8/10* (2006.01)

(52) U.S. Cl.
CPC ............ *H01M 8/04097* (2013.01); *Y02E 60/50* (2013.01); *H01M 8/04753* (2013.01); *H01M 8/04462* (2013.01); *H01M 8/04179* (2013.01); *Y02T 90/34* (2013.01); *H01M 8/04507* (2013.01); *H01M 8/0662* (2013.01); *H01M 8/04156* (2013.01); *H01M 8/04223* (2013.01); *H01M 8/04589* (2013.01); *H01M 8/04761* (2013.01); *H01M 8/04395* (2013.01); *B60L 11/1892* (2013.01); *H01M 2008/1095* (2013.01); *B60L 11/1898* (2013.01)
USPC ........... 429/408; 429/443; 429/456; 429/427; 429/428

(58) Field of Classification Search
CPC .......... H01M 8/0662; H01M 8/04089; H01M 8/04223; H01M 8/04753; H01M 8/042331; H01M 2008/1293; H01M 8/04373; H01M 8/0494; H01M 8/04559
USPC .......................... 429/408, 443, 456, 427, 428
See application file for complete search history.

(56) References Cited

U.S. PATENT DOCUMENTS

| | | | |
|---|---|---|---|
| 6,376,113 | B1 | 4/2002 | Edlund et al. |
| 6,632,552 | B2 | 10/2003 | Yamanashi |

(Continued)

FOREIGN PATENT DOCUMENTS

| | | | | |
|---|---|---|---|---|
| JP | 2003297399 | | 10/2003 | |
| JP | 2004-111196 | * | 4/2004 | .............. H01M 8/04 |

(Continued)

*Primary Examiner* — Barbara Gilliam
*Assistant Examiner* — Angela Martin
(74) *Attorney, Agent, or Firm* — Damian Porcari; Brooks Kushman P.C.

(57) ABSTRACT

A system for delivering an input fuel stream to a fuel cell stack to generate electrical current and to discharge an unused fuel stream is provided. A supply produces a supply fuel stream. An ejector combines a purged fuel stream and the supply fuel stream and controls the flow of the input fuel stream to the fuel cell stack.
A purging arrangement receives the unused fuel stream which includes impurities and purges the impurities from the unused fuel stream to generate the purged fuel stream.
A bypass valve is capable of delivering the purged fuel stream to the ejector. A blower is capable of delivering the purged fuel stream to the ejector. A controller controls one of the bypass valve and the blower for delivering the purged fuel stream to the ejector based on the amount of electrical current generated by the fuel cell stack.

8 Claims, 2 Drawing Sheets

(56) References Cited

U.S. PATENT DOCUMENTS

| | | |
|---|---|---|
| 6,841,280 B2 | 1/2005 | Iio et al. |
| 6,861,167 B2 | 3/2005 | Wells et al. |
| 6,869,707 B2 | 3/2005 | Edlund et al. |
| 6,960,401 B2 | 11/2005 | Barton et al. |
| 7,132,179 B2 | 11/2006 | St-Pierre et al. |
| 7,147,945 B2 | 12/2006 | Balliet et al. |
| 7,223,489 B2 | 5/2007 | Ueda et al. |
| 7,264,900 B2 | 9/2007 | Ueda et al. |
| 7,279,245 B1 * | 10/2007 | Clark .................. 429/410 |
| 8,273,501 B2 * | 9/2012 | Wang et al. ............ 429/513 |
| 2002/0009623 A1 | 1/2002 | St-Pierre et al. |
| 2002/0031691 A1 | 3/2002 | Haas |
| 2003/0096145 A1 | 5/2003 | Sugawara et al. |
| 2003/0148167 A1 | 8/2003 | Sugawara et al. |
| 2004/0005487 A1 | 1/2004 | Matoba |
| 2004/0115488 A1 * | 6/2004 | Sanagi et al. ............ 429/12 |
| 2005/0208357 A1 * | 9/2005 | Bitzer et al. ............ 429/34 |
| 2006/0046106 A1 | 3/2006 | Yu et al. |
| 2007/0042258 A1 | 2/2007 | Mackintosh et al. |
| 2007/0065711 A1 * | 3/2007 | Gopal ..................... 429/38 |

FOREIGN PATENT DOCUMENTS

| | | | |
|---|---|---|---|
| JP | 2004111196 | 4/2004 | |
| JP | 2005-158554 | * 6/2005 | ........ H01M 8/04 |

* cited by examiner

SYSTEM AND METHOD FOR PURGING WATER FROM A FUEL CELL STACK

BACKGROUND

1. Technical Field

The embodiments of the present invention generally relate to a system and method for purging water from a fuel cell stack.

2. Background Art

It is known that a number of fuel cells are joined together to form a fuel cell stack. Such a stack generally provides electrical current in response to electrochemically converting hydrogen and oxygen into water. The electrical current generated in such a process is used to drive various devices in a vehicle or other such apparatus. A supply generally provides hydrogen to the fuel cell stack. The fuel cell stack may use less hydrogen than provided by the supply to generate electrical power. An ejector receives unused hydrogen discharged from the fuel cell stack and combines the unused hydrogen with the hydrogen generated from the supply to sustain a flow of hydrogen to the fuel cell stack. In some cases, the unused hydrogen may include impurities such as water that is in the form of de-ionized water (DI) vapor and/or nitrogen which may need to be removed from the unused hydrogen prior to the delivery of the unused hydrogen to the ejector. The impurities are generally by-products generated in response to combining hydrogen with oxygen. The nitrogen may cross over into the unused hydrogen by diffusion through a membrane in the fuel cell from a cathode side. A majority of the water (both in liquid and in vapor form) is discharged from the fuel cell stack to an exhaust of the cathode side on the fuel cell stack. However, a fraction of the water generated may permeate into the unused hydrogen. The ejector presents the supply hydrogen with the unused hydrogen to the fuel cell stack. The recirculation of the unused hydrogen to the fuel cell stack may improve fuel efficiency.

The amount of flow of hydrogen that is passed through the fuel cell stack fluctuates based on the amount of current produced by the fuel cell stack. In a high current generating mode, the flow of the unused hydrogen discharged from the fuel cell stack is generally high since the fuel cell stack has to consume more hydrogen at a relatively faster rate in order to generate a greater amount of power. In a low current generating mode, the flow of the unused hydrogen discharged from the fuel cell stack is low since the fuel cell stack consumes a small amount of hydrogen while producing smaller amounts of power.

In the low current generating mode, the low flow rate of unused hydrogen may make it difficult to remove impurities and cause fuel starvation since the water generated in response to electro-chemically combining hydrogen and oxygen may not pass through the fuel cell stack since there is not enough flow to push the unused hydrogen through the fuel cell stack. The low flow rate of the unused hydrogen and the presence of impurities in the unused hydrogen may affect the production of electrical power and adversely affect the life span of the fuel cell stack.

SUMMARY

In at least one embodiment, a system for delivering an input fuel stream to a fuel cell stack to generate electrical current and to discharge an unused fuel stream is provided. The system comprises an anode supply, an ejector, a purging arrangement, a bypass valve, a blower, and a controller. The anode supply is adapted to produce a supply fuel stream. The ejector is configured to combine a purged fuel stream and the supply fuel stream for generating the input fuel stream and to control the flow of the input fuel stream to the fuel cell stack. The purging arrangement is positioned between the ejector and the fuel cell and adapted to receive the unused fuel stream having impurities therein from the fuel cell and to purge the impurities from the unused fuel stream for generating the purged fuel stream. The bypass valve is in fluid communication with the purging arrangement and the ejector and is capable of delivering the purged fuel stream to the ejector. The blower is in fluid communication with the purging arrangement and the ejector and capable of delivering the purged fuel stream to the ejector. The controller is operably coupled to the bypass valve and the blower and adapted to the control one of the bypass valve and the blower for delivering the purged fuel stream to the ejector based on the amount of electrical current generated by the fuel cell stack.

DETAILED DESCRIPTION

Figure 1:
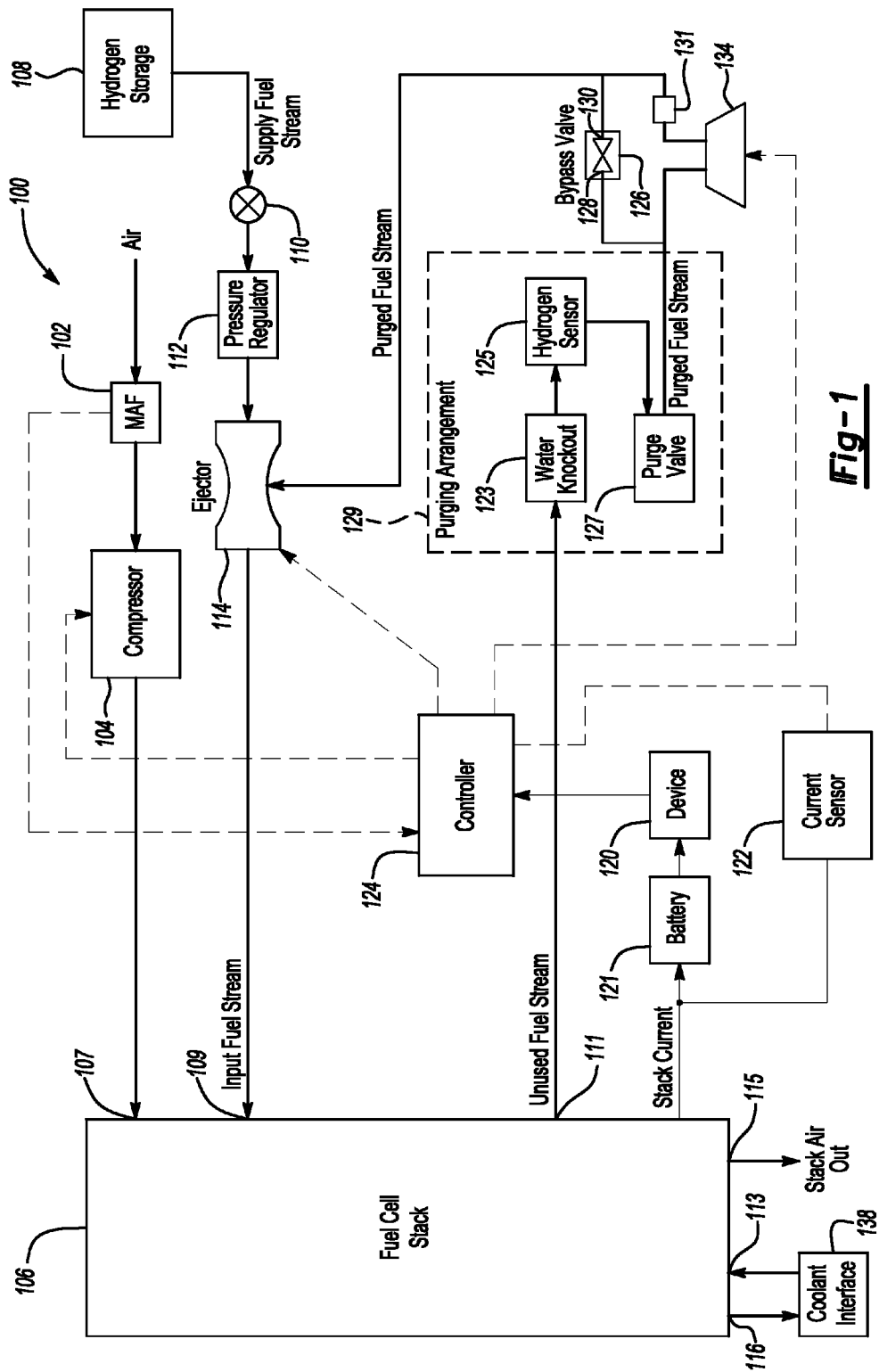
FIG. 1 illustrates an exemplary fuel cell stack recirculating and purging system in accordance with one embodiment of the present invention.

FIG. 1 illustrates an exemplary fuel cell stack recirculating system 100 in accordance with one embodiment of the present invention. The system 100 may be implemented in fuel cell based electric vehicle or fuel cell based hybrid vehicle or any other such apparatus that uses electrical current to drive various devices.

A first fluid stream (or cathode stream) which comprises of air is fed to a mass air flow (MAF) sensor 102. The air passing through the MAF sensor 102 is atmospheric air. The MAF sensor 102 measures the amount of flow of air in the fluid stream. An air compressor 104 pressurizes the air stream and delivers the air stream to a fuel cell stack 106. The fuel cell stack 106 includes a first inlet 107 for receiving the air stream. A humidifier (not shown) may be added to the system 100 to add water vapor into the air stream. If the air includes a high water content, a humidity sensor (not shown) may be needed to measure the wet air. The water may be needed to ensure that membranes (not shown) in the fuel cell stack 106 remain humidified to provide for optimal operation of the fuel cell stack 106.

A tank (or supply) 108 presents a supply fuel stream (or an anode stream) in the form of hydrogen. The supply fuel stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrids may be used instead of compressed gas.

A tank valve 110 controls the flow of the supply hydrogen. A pressure regulator 112 regulates the flow of the supply hydrogen. An ejector 114 (either a variable or multistage ejector or other suitable ejector) is configured to combine the supply hydrogen (e.g., hydrogen received from the tank 108) with unused hydrogen (e.g., recirculated from the fuel cell stack 106) to generate an input fuel stream (or stack hydrogen). The pressure regulator 112 is generally adapted to provide the supply hydrogen to the ejector 114 at a constant pressure. A humidifier (not shown) may be provided to add water vapor to the input fuel stream. Humidified water vapor in the input fuel stream may be needed to ensure that the membranes in the fuel cell stack 106 remain humidified to provide for optimal operation of the fuel cell stack 106.

The ejector 114 controls the flow of the input fuel stream to the fuel cell stack 106. The fuel cell stack 106 includes a second inlet 109 that is adapted to receive the input fuel stream from the ejector 114. The fuel cell stack 106 generates stack current in response to electrochemically converting the hydrogen from the input fuel stream and oxygen from air in the first fluid stream. A battery 121 is operably coupled to the fuel cell stack 106 to store and discharge power generated by the fuel cell stack 106.

Various electrical devices 120 are coupled to the battery to consume such power in order to operate. If the system 100 is used in connection with a vehicle, the devices 120 may include a motor or a plurality of vehicle electrical components that each consume power to function for a particular purpose. For example, such devices 120 may be associated with and not limited to a vehicle powertrain, occupant heating and cooling, interior/exterior lighting, entertainment devices, and power locking windows. The particular types of devices 120 implemented in the vehicle may vary based on vehicle content, the type of motor used, and the particular type of fuel cell stack implemented. A current sensor 122 measures the stack current generated by fuel cell stack 106. The current sensor 122 transmits measured current readings to a controller 124.

In general, excess amounts of air and hydrogen are delivered to the fuel cell stack 106 to increase operational robustness of the fuel cell stack 106. The fuel cell stack may discharge unused hydrogen in an unused fuel stream. An outlet 111 of the fuel cell stack 106 is adapted to discharge the unused fuel stream. The unused fuel stream may include various impurities such as nitrogen and water both in liquid and vapor form in addition to hydrogen.

A purging arrangement 129 is configured to receive the unused fuel stream for purging impurities from the unused fuel stream to generate a purged fuel stream such that the purged fuel stream contains a substantial amount of hydrogen. The purging arrangement 129 includes a water knockout system 123. The water knockout system 123 receives the unused fuel stream from the fuel cell stack 106. The water knockout system 123 is adapted to remove water in liquid form from the unused fuel stream. The water knockout system 123 is operatively coupled to the controller 124. The water knockout system 123 includes a drain valve (not shown) with a level switch indicator (not shown). The controller 124 operates the drain valve such that the drain valve opens to allow the water to flow therethrough out of the unused fuel stream in response to the level switch indicator indicating that a predetermined amount of liquid water is present in the unused fuel stream.

The purging arrangement 129 includes a hydrogen concentration sensor 125 that measures the amount of hydrogen in the unused fuel steam and transmits data indicative of the amount of hydrogen to the controller 124. In one example, the hydrogen concentration sensor 125 may be implemented to include the teachings of the gas analyzing apparatus as disclosed in co-pending U.S. Ser. No. 11/318,143; U.S. Patent Publication No: 20070148510, now U.S. Pat. No. 7,654,128, filed on Dec. 23, 2005, entitled "Gas Analyzing Apparatus and Method", which is hereby incorporated in its entirety by reference. The controller 124 includes a predetermined hydrogen set point stored therein to determine whether the amount of unused fuel stream includes a higher concentration of hydrogen or nitrogen. If the unused fuel steam includes an amount of hydrogen that is greater than the predetermined hydrogen set point, then the controller 124 determines that more hydrogen is in the unused fuel stream than nitrogen. If the controller 124 determines that the unused hydrogen stream includes an amount of hydrogen that is less than the predetermined hydrogen set point, then the controller 124 determines that less hydrogen is in the unused fuel stream than nitrogen. In one example, the predetermined hydrogen set point may be set to 60%.

The purging arrangement 129 includes a purge valve 127 that is fluidly coupled to the hydrogen concentration sensor 125 and electrically coupled to the controller 124. In the event more nitrogen is in the unused fuel stream than hydrogen based on the comparison of hydrogen to the predetermined hydrogen set point, the controller 124 controls the purge valve 127 to open to discharge the nitrogen from the unused fuel stream. In response to the purge valve 127 opening to discharge nitrogen, the controller 124 controls the tank valve 110 to increase the flow of hydrogen into the system 100 to increase the amount of hydrogen present in the system 100. The controller 124 controls the purge valve 127 to close in response to detecting that the hydrogen in the unused fuel stream is above the predetermined hydrogen set point.

A bypass valve 126 is configured to receive the purged fuel stream from the purge valve 127 and is electrically coupled to the controller 124. The bypass valve 126 includes an inlet 128 for receiving the purged fuel stream and an outlet 130 for delivering the purged fuel stream to the ejector 114. A blower 134 is configured to receive the purged fuel stream and increase the flow and pressure rate for recirculating the purged fuel stream in response to the controller 124. The bypass valve 126 and the blower 134 are coupled in a parallel manner with respect to the purge valve 127.

The controller 124 activates the blower 134 to increase the flow of the purged fuel stream based on the amount of power that is generated by the fuel cell stack 106. While the fuel cell stack 106 is in a low current generating mode, the flow and pressure of the unused fuel stream and the purged fuel stream may be low. In general, the fuel cell stack 106 may be in the low current generating mode when the vehicle or apparatus is in an idle state. In such a case, water buildup may occur within flow channels (or fields) of the fuel cell plate in the fuel cell stack 106 and prevent hydrogen from contacting the membrane. In addition, while in the low current generating mode, in the event there is more nitrogen in the unused fuel stream than hydrogen (generally such a condition may not exist while the fuel cell stack 106 is operating under normal operation, but may, nonetheless exist), such a condition may provide a gas mixture that is heavier when compared to the unused fuel stream that includes a sufficient amount of hydrogen. The heavier weight characteristic coupled with the low flow condition caused while the system 100 is in the low current generating mode may make it difficult to recirculate the proper amount of hydrogen back to the fuel cell stack 106. In the low current generating mode, the controller 124 controls the blower 134 to increase the flow rate and pressure of the unused fuel stream and the purged fuel stream. While in the low current generating mode, the controller 124 closes the inlet 128 of the bypass valve 126 to force the purged fuel stream to pass to the blower 134. The increased flow rate created by the blower 134 drives water from the flow fields of the fuel cell plate and prevents localized fuel starvation and cell corrosion. By purging the nitrogen from the unused fuel stream, blower efficiency may be achieved as the blower 134 may use less power to increase the flow of the purged fuel stream since the overall weight of the purged fuel stream is reduced due to the purging of the nitrogen from the unused fuel stream.

In the event the fuel cell stack 106 is in a high current generating mode (e.g., vehicle operating at high speed and generating large amounts of current), the controller 124 may disable the blower 134 and activate the bypass valve 126 to allow the purged fuel stream to pass through the bypass valve 126 and to the variable ejector 114. In the high current generating mode, the flow rate and pressure of the unused fuel stream and the purged fuel stream may be adequate to carry water away from the flow fields of the fuel cell plate. The use of the blower 134 may not be needed while the system 100 is in the high current generating mode. In the high current generating mode, the purged fuel stream passes through the bypass valve 126 and not through the blower 134 to prevent the blower 134 from becoming a flow restrictor. A check valve 131 is coupled in series with the blower 134. The check valve 131 prevents a reverse flow of the purged fuel stream back to the blower 134 while the system 100 is in the high current generating mode.

The ejector 114 is adapted to increase or decrease the flow rate of the input fuel stream into the stack 106 and pressure of hydrogen (e.g., the unused hydrogen discharged from the fuel cell stack 106 and the supply hydrogen delivered from the tank 108) presented to the fuel cell stack 106 in response to the controller 124. The ejector 114 is adapted to receive the supply hydrogen at a constant pressure rate. The ejector 114 is adapted to receive the purged fuel stream at varying flow rates.

The ejector 114 may be implemented with a solenoid (not shown) and/or a needle valve (not shown). The solenoid may move the needle valve in the ejector 114 in response to the controller 124 thereby allowing for an increase or decrease of the flow and pressure of input fuel stream presented to the fuel cell stack 106. The movement of the needle is variable in nature to allow for different flow rates of the unused hydrogen to be combined with the supply fuel stream from the tank 108. Such a variable characteristic allows the ejector 114 to adjust the overall flow and pressure of the input fuel stream presented to the fuel cell stack 106. While the system 100 is in the high current generating mode, the ejector 114 increases the flow of the input fuel stream to a level above the flow provided by the blower 134 which may be adequate to remove water from the membranes of the fuel cells in the fuel cell stack 106.

The fuel cell stack 106 includes an outlet 115 that is configured to discharge excess air. The fuel cell stack 106 includes outlet 116 that is adapted to present coolant in the form of de-ionized water ethylene glycol (DIWEG) or other suitable coolant in response to the heat generated due to the chemical processing of hydrogen and oxygen (e.g., from the air stream). A cooling interface 138 may receive the DIWEG from the fuel cell stack 106. The cooling interface 138 may also provide stack coolant to an inlet 113 of the fuel cell stack 106.

Figure 2:
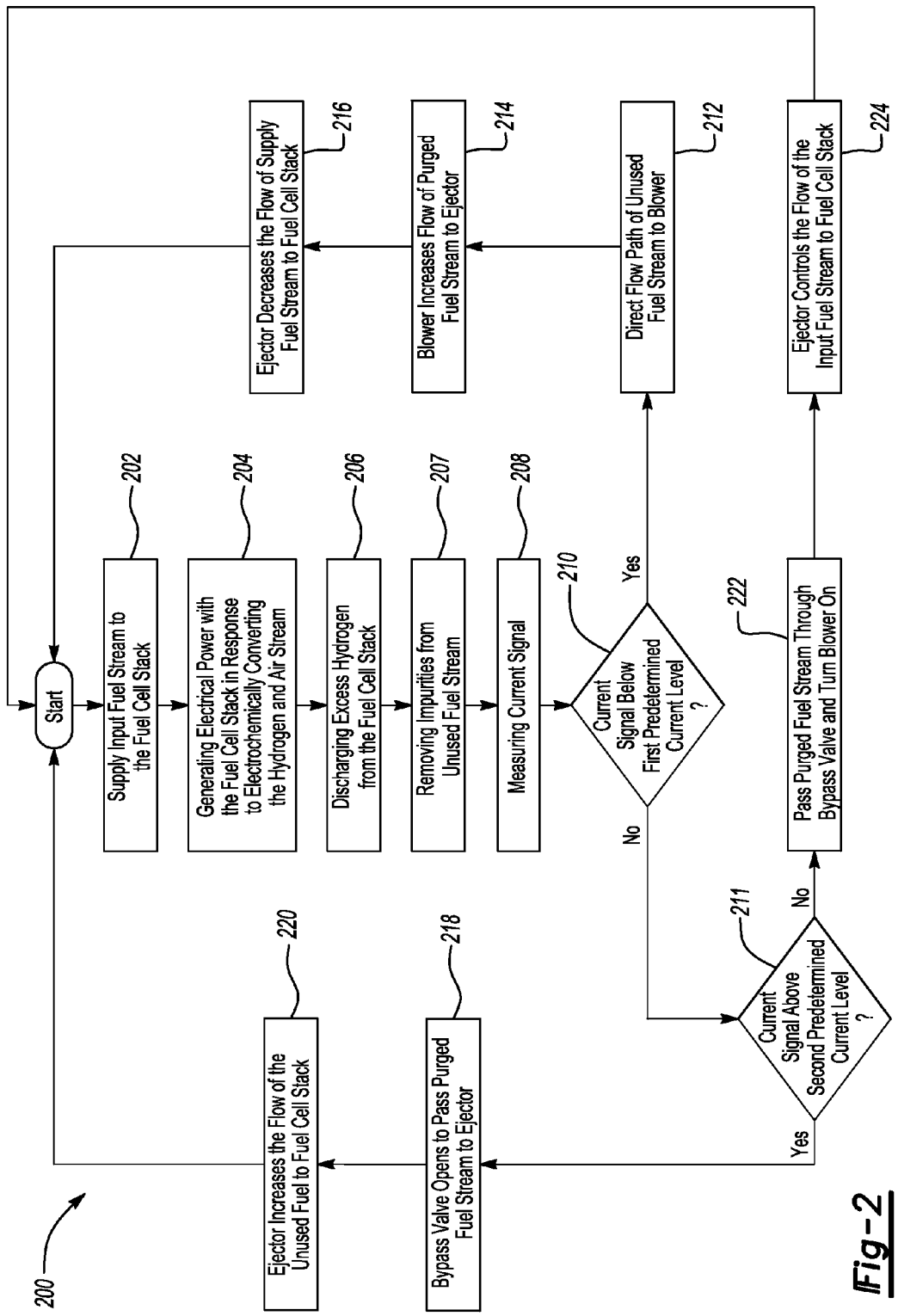
FIG. 2 illustrates a flow diagram for recirculating at least one fuel stream and for purging impurities from the at least one fuel stream.

FIG. 2 illustrates a flow diagram 200 for recirculating at least one fuel stream through the fuel cell stack 106 for purging impurities from the one fuel stream in accordance to one embodiment of the present invention.

In block 202, the ejector 114 supplies the input fuel stream to the fuel cell stack 106.

In block 204, the fuel cell stack 106 generates stack current in response to electrochemically converting hydrogen from the input fuel stream and oxygen (from the first fluid stream).

In block 206, the fuel cell stack 106 delivers the unused fuel stream which may include impurities such as water (e.g., DI) and nitrogen to the purging arrangement 129.

In block 207, the purging arrangement 129 removes impurities from the unused fuel stream to generate the purged fuel stream. The water knockout system 123 may discharge water in liquid form from the unused fuel stream in response to the controller 124. The hydrogen concentration sensor 125 measures the amount of hydrogen that is in the unused fuel stream and transmits measured hydrogen data to the controller 124. The purge valve 127 discharges nitrogen by draining the unused fuel stream from the system 100 in the event the controller 124 determines that the amount of hydrogen in the unused fuel stream is below the predetermined hydrogen set point. As the controller 124 controls the purge valve 127 to open for discharging the unused fuel stream to remove discharge the nitrogen, the controller 124 controls the supply 108 to stop the flow of hydrogen into the system 100 to increase the hydrogen concentration in the unused fuel stream.

In block 208, the current sensor 122 measures the amount of current generated by the fuel cell stack 106 and transmits raw electrical data indicative of the amount of current to the controller 124.

In block 210, the controller 124 determines whether the amount of current generated by the fuel cell stack 106 is below a first predetermined current level. The controller 124 processes the data transmitted by the current sensor 122 and generates a current signal. The controller 124 compares the current signal to the first predetermined current level to determine whether to activate the blower 134 for increasing the flow rate of purged fuel stream. If the current signal is below the first predetermined current level, the diagram 200 moves to block 212.

In block 212, the blower 134 may increase the flow of purged fuel stream to the ejector 114 in response to the controller 124 driving the blower 134. When the current signal is below the first predetermined current level, such a condition is indicative of the system 100 being in a low current generating mode. In one example, for a vehicle fuel cell implementation, the vehicle may be in an idle state when the current signal is below the first predetermined current level. For the vehicle fuel cell implementation, the first predetermined current level may correspond to a range of between 0 and 30 amps. The particular values used to define the first predetermined current level while in the low current generating mode may vary based on the size and type of fuel cell stack 106.

In the low current generating mode, the fuel cell stack 106 is taking in a lesser amount of hydrogen since the fuel cell stack 106 may not be required to generate a large amount of current. In light of the smaller amount of hydrogen that is being consumed by the fuel cell stack 106, the fuel cell stack 106 may discharge the unused hydrogen in the unused fuel stream at a lower flow thereby decreasing the overall flow and pressure of the input fuel stream that is presented to the fuel cell stack 106. Such a decrease in the flow and pressure of input fuel stream to the fuel cell stack 106 may degrade performance and reduce the overall life of the stack 106. To compensate for the lower flow of hydrogen and the low pressure of the input fuel stream, the controller 124 drives the blower 134 to increase the flow of the purged fuel stream to the ejector 114. The controller 124 may also control the bypass valve 126 to close. The blower 134 assists in removing water from the flow fields by increasing the flow and pressure of the unused fuel stream.

In block 216, the ejector 114 drives a needle valve or other suitable valve such that a lesser amount of the purged fuel stream is combined with the supply fuel stream generated by the supply 108 in response to the controller 124. Such an effect creates a vacuum (or sonic flow) thereby increasing the overall flow rate and pressure of the input fuel stream delivered to the fuel cell stack 106. Such an increase in the flow rate and pressure may increase the probability for electrochemically converting hydrogen with oxygen to generate more electrical current since water is moved away from the flow fields which allows hydrogen to contact the membranes. Further, by purging the impurities with the purging arrangement 129, such a property may ensure that the blower 134 operates more efficiently since the blower 134 may not have to move the purged fuel stream which includes large amounts of nitrogen.

In block 210, if the controller 124 determines that the current signal is above the first predetermined current level, then the diagram 200 moves to block 211.

In block 211, the controller 124 determines whether the stack current being generated is above a second predetermined current level. The controller 124 compares the current signal to the second predetermined current level to determine if the bypass valve 126 should be activated and the blower 134 should be deactivated. If the current signal is above the second predetermined current level, then the diagram 200 moves to block 218.

In block 218, the controller 124 controls the bypass valve 126 to open for passing the purged fuel stream to the ejector 114. When the current signal is above the second predetermined current level, such a condition is indicative of the system 100 being in the high current generating mode. In one example, for a vehicle fuel cell implementation, the vehicle may be in a high idle state when the current signal is above the second predetermined current level. For the vehicle fuel cell implementation, the second predetermined current level may correspond to the fuel cell stack generating over 30 amps. The particular current values used to define the second predetermined current level may vary based on the size and type of fuel cell stack 106 used.

In the high current generating mode, the fuel cell stack 106 is taking in a greater amount of hydrogen in order to generate increased levels of current needed to drive the devices 120. In light of the greater amount of hydrogen that is being received by the fuel cell stack 106, the fuel cell stack 106 outputs the unused fuel stream at a higher flow and pressure rate. While in the high current generating mode, the controller 124 controls the bypass valve 126 to open for delivering the purged fuel stream to the ejector 114. In response to the controller 124 controlling the bypass valve 126 to open for directing the flow of the purged fuel stream directly to the ejector 114, the controller 124 shuts down the blower 134.

In block 220, the controller 124 may drive the ejector 114 such that the needle valve in the ejector 114 moves to a position so as to allow for an increased flow of the purged fuel stream to pass through the ejector 114 along with the constant flow of the supply fuel stream provided from the supply 108. Such an increased flow of the purged fuel stream through the ejector 114 along with the constant flow of the supply fuel stream from the supply 108 may be sufficient to meet the increased hydrogen flow demands placed on the system 100 when the system 100 is in the high current generating mode.

In general, blocks 218 and 220 are indicative of the system 100 performing a passive recirculation of the unused hydrogen through the fuel cell stack 106. Such a passive recirculation may not need the assistance of the blower 134 to increase the flow of the unused hydrogen through the system 100. The system 100 is adapted to take advantage of the increased flow of the unused hydrogen that is discharged from the fuel cell stack 106 to assist in providing for an adequate amount of pressure and flow of hydrogen when the system 100 is in the high current generating mode. The purging arrangement 129 continues to remove impurities from the unused fuel stream to minimize the weight of the fuel stream and to ensure that a sufficient amount of hydrogen is delivered to the fuel cell stack 106. If the current signal is not above the second predetermined current level, then the diagram 200 moves to block 222.

In block 222, the controller 124 controls the bypass valve 126 to partially open for passing a portion of the purged fuel stream therethough and controls the blower 134 to increase the flow of the purged fuel stream such that a variable flow of the purged fuel stream may be passed to the ejector 114. By directing the flow to both the bypass valve 126 and the blower 134 while the current signal is above the first predetermined current level and below the second predetermined current level, the system 100 provides for an additional level of control for controlling the amount of flow and pressure of purged fuel stream that is delivered to the fuel cell stack 106. Conventional systems may only provide for two-state control model (on/off) for delivering unused hydrogen to the fuel cell stack 106. In block 224, the ejector 114 controls the flow of the input fuel stream to the fuel cell stack 106.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for delivering an input fuel stream to a fuel cell stack to generate electrical current and to discharge an unused fuel stream, the system comprising:
   an anode supply for producing a supply fuel stream;
   an ejector configured to combine a purged fuel stream and the supply fuel stream for generating the input fuel stream and to control the flow of the input fuel stream to the fuel cell stack;
   a purging arrangement positioned between the ejector and the fuel cell stack and adapted to receive the unused fuel stream having impurities therein from the fuel cell stack and to purge the impurities from the unused fuel stream for generating the purged fuel stream;
   a bypass valve in fluid communication with the purging arrangement and the ejector for delivering the purged fuel stream to the ejector;
   a blower in fluid communication with the purging arrangement and the ejector for delivering the purged fuel stream to the ejector; and
   a controller for being electrically coupled to the bypass valve and the blower, the controller being configured to the control one of the bypass valve and the blower for delivering the purged fuel stream to the ejector based on the amount of electrical current generated by the fuel cell stack.

2. The system of claim 1 further comprising a current sensor for being electrically connected to the controller and to the fuel cell stack, the current sensor being configured to measure the amount of electrical current generated by the fuel cell stack and transmit a current signal indicative of the amount of electrical current being generated by the fuel cell stack to the controller.

3. The system of claim 2 wherein the controller includes a first predetermined current level and is configured to compare the current signal to the first predetermined current level to determine whether to control one of the bypass valve and the blower to deliver the purged fuel stream to the ejector.

4. The system of claim 3 wherein the controller is further configured to control the blower to deliver the purged fuel stream to the ejector in response to determining that the current signal is below the first predetermined current level.

5. The system of claim 4 wherein the controller includes a second predetermined current level and is configured to compare the current signal to the second predetermined current level to determine whether to control one of the bypass valve and the blower to deliver the purged fuel stream to the ejector.

6. The system of claim 5 wherein the controller is further configured to control the bypass valve to deliver the purged fuel stream to the ejector in response to determining that the current signal is above the second predetermined current level.

7. The system of claim 1 further comprising a check valve configured to prevent a reverse flow of the purged fuel stream to the blower.

8. The system of claim 7 wherein the check valve includes an input and an output and the input of the check valve is in fluid communication with the blower and the output of the check valve is in fluid communication with the ejector.

* * * * *